US 9,424,424 B2

(12) United States Patent
Klein

(10) Patent No.: US 9,424,424 B2
(45) Date of Patent: Aug. 23, 2016

(54) CLIENT BASED LOCAL MALWARE DETECTION METHOD

(71) Applicant: TRUSTEER LTD., Tel Aviv (IL)

(72) Inventor: Amit Klein, Herzliya (IL)

(73) Assignee: TRUSTEER, LTD., Tel Aviv (IL)

(*) Notice: Subject to any disclaimer, the term of this patent is extended or adjusted under 35 U.S.C. 154(b) by 309 days.

(21) Appl. No.: 13/858,238

(22) Filed: Apr. 8, 2013

(65) Prior Publication Data
US 2014/0304816 A1    Oct. 9, 2014

(51) Int. Cl.
*G06F 11/00*     (2006.01)
*G08B 23/00*     (2006.01)
*G06F 21/56*     (2013.01)
*H04L 29/06*     (2006.01)
*G06F 11/30*     (2006.01)

(52) U.S. Cl.
CPC ........... *G06F 21/56* (2013.01); *G06F 21/566* (2013.01); *H04L 63/14* (2013.01); *H04L 63/168* (2013.01)

(58) Field of Classification Search
CPC ... G06F 21/56; G06F 21/566; H04L 63/168; H04L 63/14
USPC .............. 713/153–154, 187–188, 193–194; 726/1, 13, 22–33; 709/206, 249, 389
See application file for complete search history.

(56) References Cited

U.S. PATENT DOCUMENTS 6,721,721 B1 *  4/2004  Bates et al.
8,677,481 B1 *  3/2014  Lee ................. H04L 63/168
                                                                726/22
2011/0239300 A1    9/2011  Klein et al.
2011/0289582 A1 * 11/2011  Kejriwal ............ G06F 21/566
                                                                726/22
2012/0174236 A1 *  7/2012  Goodwin ............ H04L 63/102
                                                                726/27

OTHER PUBLICATIONS

Konrad Rieck et al: "Cujo", Proceedings of the 26th Annual Computer Security Applications Conference on, ACSAC '10, Jan. 1, 2010, p. 31, XP055121846, New York, New York, USA DOI:10. 1145/1920261.1920267 ISBN: 978-1-45-0301 33-6.
Niels Provos et al: "The Ghost in the Browser Analysis of Web-based Malware", Apr. 10, 2007, XP055121668, Retrieved from the Internet: URL:http://www.usenix.org/event/hotbots07/tech/full_papers/provos/provos.pdf.
Christian Seifert, et al., "Identification of Malicious Web Pages with Static Heuristics", Telecommunication Networks and Applications Conference, 2008. ATNAC 2008. Australasian, Dec. 7, 2008 IEEE, Piscataway, NJ, USA page(s): 91-96.
Charlie Curtsinger, et al., "Zozzle: Fast and Precise In-Browser JavaScript Malware Detection", Aug. 8, 2011 ittp://www.usenix.org/event/sec11/tech/full_papers/Curtsinger.pdf.
European Search Report in EP 14162808, Jun. 6, 2014.

* cited by examiner

*Primary Examiner* — Evans Desrosiers
(74) *Attorney, Agent, or Firm* — Daneil J. Swirsky; AlphaPatent Associates Ltd.

(57) ABSTRACT

A method for detecting malware in a user terminal device that has been infected by malware via a browser running on the user terminal device, according to which upon detecting a predetermined a triggering event on the user terminal, a security application installed on the terminal automatically activates a transparent browser to navigate to one or more predetermined URLs. Then the security application checks the code of an inspected webpage that has been received immediately after it is opened by the transparent browser and rechecks the code after being at least partially processed by the transparent browser. If a change the code is detected, an alert is issued, indicating that the terminal has been infected by malware.

11 Claims, 2 Drawing Sheets

CLIENT BASED LOCAL MALWARE DETECTION METHOD

FIELD OF THE INVENTION

The present invention relates to the field of Internet security. More particularly, the invention relates to a client based method for detecting malware in a user terminal device, such as a user computer, that has been infected by malware via a browser running on the user terminal device.

BACKGROUND OF THE INVENTION

As more users are connected to the Internet and conduct their daily activities electronically, computer users have become the target of an underground economy that infects hosts with malicious software, also known as malware, mainly for financial gain. Unfortunately, even a single visit to an infected web site enables the attacker to detect vulnerabilities in the user's browser and to allow malware to infect the user's computer. Frequently, this malware allows the adversary to gain access to confidential data or even full control of the compromised terminal devices, leading to the ex-filtration of sensitive information or installation of utilities that facilitate remote control of the host.

Internet services are increasingly becoming an essential part of our everyday life. We rely more and more on the convenience and flexibility of Internet-connected devices to communicate and, in general, to perform tasks that would otherwise require our physical presence, such as banking tasks. Although very beneficial, Internet transactions can expose user sensitive information. Banking and medical records, authorization passwords and personal communication records can easily become known to an adversary who can successfully compromise any of the devices that are connected.

In most cases, a successful exploit results in infection by malware which installs itself on the user's computer (or any other user's terminal device that connects to a data network such as the Internet). Malware can be used to steal sensitive information such as banking passwords, especially when the user activates his browser.

To address this problem efficient malware detection tools are required.

US 2011/0239300 having the same applicant discloses a method for detecting HTML-modifying malware present in a computer. A determination is made whether a modified string exists in the web page received by a browser. Malware is determined to be present in the computer if a modifying element is found, whereupon one or more alerting or preventing tasks may be generated. US 2011/0239300, the contents of which is incorporated herein by reference, provides a remote server that comprises a malware scanning engine for scanning a webpage displayed by the user's browser over a network. The malware scanning engine is adapted to detect changes in the displayed webpage which are indicative of the presence of malware injected in the user's terminal. However, in case when a user accesses the server with a browser which is not "supported" by the malware (i.e., the malware has not been written to attack this type of browser), the user's computer will not be detected as infected with the malware. Also, the method proposed by US 2011/0239300 can detect malware only when the user is connected to a website.

It is therefore an object of the present invention to provide a client side malware detection method.

Other objects and advantages of the invention will become apparent as the description proceeds.

SUMMARY OF THE INVENTION

The present invention is directed to a method for detecting malware in a user terminal device that has been infected by malware via a browser running on the user terminal device, comprising the following steps:
a) upon detecting a predetermined a triggering event on the user terminal, automatically activating, by a security application installed on the terminal, a transparent browser to navigate to one or more predetermined URLs;
b) checking, by the security application, the code of an inspected webpage that has been received immediately after it is opened by the transparent browser;
c) rechecking the code, by the security application, after being at least partially processed by the transparent browser; and
d) if a change the code is detected, issuing an alert that the terminal has been infected by malware.

The predetermined URLs may correspond to websites that are likely to be attacked by malware and may be stored in a library.

The security application may be adapted to check the code of an inspected webpage that has been received before being opened by the transparent browser, while being in HTML format.

In one embodiment, instead of rechecking the code after being processed, the security application checks the code of an inspected webpage that has been received by identifying templates of the malware's code injections. The templates may be textual portions asking the user of the terminal device to type information into fields that are excluded from the code of an inspected webpage as received by the transparent browser.

In one embodiment, instead of causing the transparent browser to navigate to predetermined URLs, the security application may be adapted to emulate navigations to the URLs by locally returning an emulated webpage that is selected from a local database.

The security application may emulate navigations to the URLs by:
a) intercepting call functions activated by the transparent browser during runtime and before generating data that reaches the network interface; and
b) locally returning an emulated webpage to the transparent browser.

Plug-ins and browser extensions may be disabled from the transparent browser.

The present invention is also directed to a method for detecting malware in a user terminal device that has been infected by malware via a browser running on the user terminal device, comprising the following steps:
a) upon detecting a predetermined a triggering event on the user terminal, automatically activating, by a security application installed on the terminal, a transparent browser to navigate to one or more predetermined URLs;
b) allowing the security application to return to the transparent browser webpages collected from the interfaceable browser by dedicated plug-ins, which are preinstalled in the interfaceable browser and are adapted to record webpages of interest; and c) if a change in one or more collected pages is detected, issuing an alert that the terminal has been infected by malware.

In one embodiment, instead of activating a transparent browser and rechecking the code after being processed, the security application can detect changes in the code of each webpage by:

a) accessing webpages via the user interfaceable browser, while browsing; and
b) inspecting the webpages by using a heuristic process to detect known textual pieces of code that the malware injects and hidden frames that are being used by the malware.

The triggering event may be detecting that the user activates the interfaceable browser or a time based trigger or restarting the user's terminal device.

DETAILED DESCRIPTION OF PREFERRED EMBODIMENTS

In everyday life a user accesses a website for example by clicking on a hyperlink (URL) to the website. The user then navigates through the website to find a web page of interest. Usually, a hypertext markup language (HTML) form of a desired web page is presented or displayed via a browser window in the user terminal or by other computerized means known in the art.

The present invention is related to a method for detecting malware in a computer that has been infected via a running browser and for preventing the fraudulent interception of online sensitive information by real time detection, in response to user computer activity, while browsing in the presence of the malware in his computer (or any other user's terminal device that connects to a data network, such as the Internet). This is generally done by a security application that is installed on the user's computer, which inspects HTML pages that have been received by the user's interfaceable (real) browser while visiting particular websites, and detects changes in the content or code of these HTML pages that may result from the malware.

Figure 1:
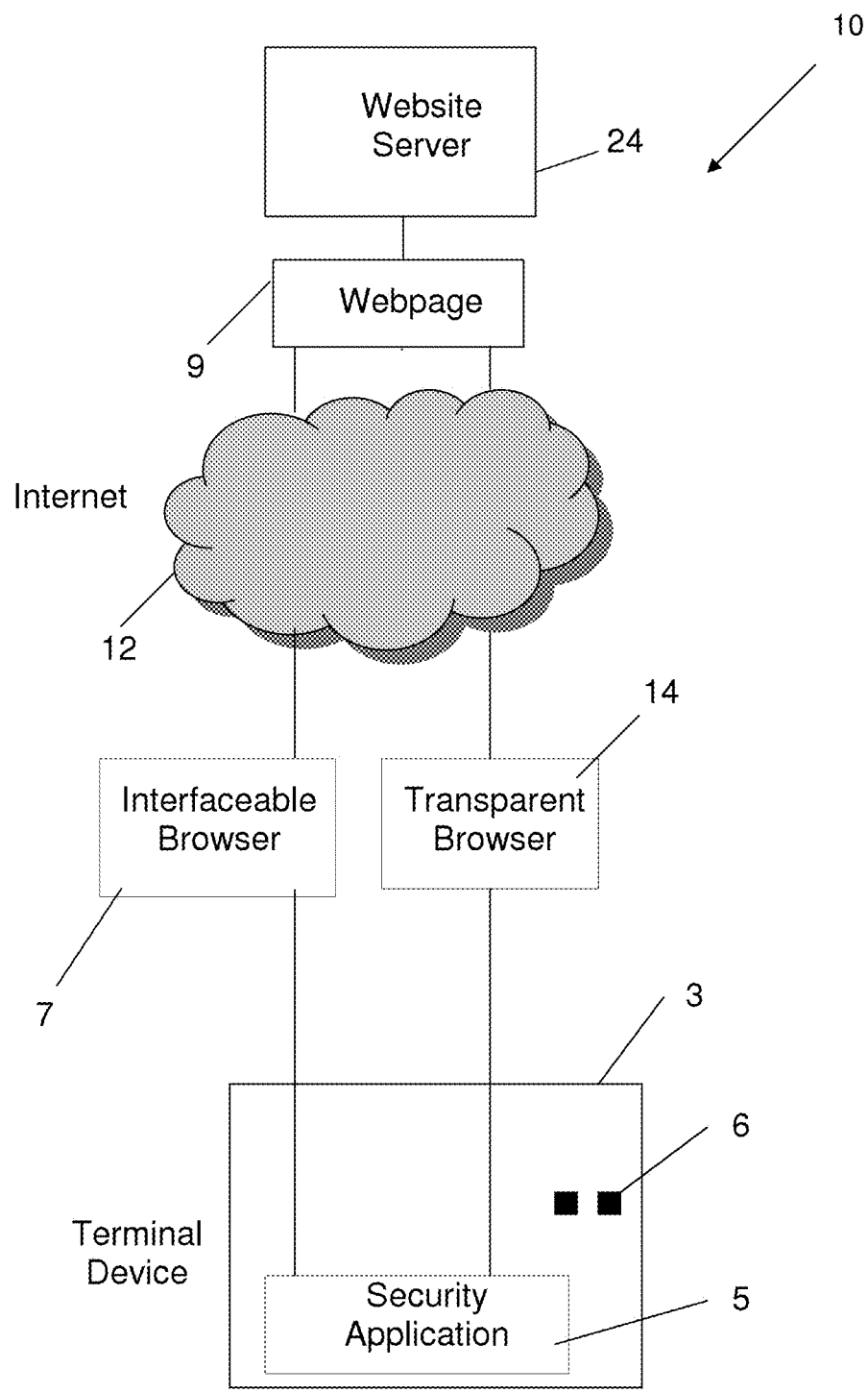
FIG. 1 is a schematic illustration for a malware detection system and method, according to one embodiment of the invention.

FIG. 1 schematically illustrates a system generally designated by numeral 10, according to one embodiment of the present invention, for detecting malware that has been injected in a browser as a result of user computer activity. System 10 comprises user terminal 3 that is connectable with a website server 24 via Internet 12, or a connection over any other suitable data network. User terminal 3 has a user interfaceable (real) browser 7, which when executed, downloads a webpage 9 selected by the user from server 24 by means of an input device 6 in the conventional manner, usually after accessing a hyperlink (URL). User terminal 3 also has a transparent (invisible) browser 14, which is not visible to the user, in order to detect malware, as will be described hereinafter. A client-side security application 5, which is installed on the user terminal 3, activates the transparent browser 14 according to predetermined instructions stored therein.

The security application 5 causes transparent browser 14 to navigate to several URLs of websites that are likely to be attacked by malware (for example, websites of banks) and checks if webpage 9 (or another copy of the server resource) has been modified by malware. Thus, unlike the method proposed by US 2011/0239300, in the present invention the security application 5 can navigate the transparent browser 14 to many websites that are likely to be attacked by malware. The security application 5 is also adapted to check the code of the inspected webpage 9 that has been received immediately after it is decrypted by the transparent browser 14. This check is used as a reference (baseline). Then, the security application 5 checks it again after passing several processing steps during preparation for rendering by the transparent browser 14, so as to detect whether or not the code of the inspected webpage 9 has been changed. This may be done by using dedicated hooks (interfaces provided in packaged code that allows a programmer to insert customized programming) to the transparent browser 14 that are capable of seeing the webpage 9 when decrypted at the transparent browser 14 (by using a first hook) and immediately after it is being processed by it (by using a second hook). The security application 5 is adapted to run the same several processing steps in parallel, so as to compare between the codes after passing the same processing steps. According to this embodiment, the security application 5 may be adapted to implement any function that is appropriate to compare between the expected code of the inspected webpage 9 and the actual code, after being exposed to malware activity by the transparent browser 14. If a substantial code change is detected, it is likely that is has been caused by malware that infected the user terminal 3.

According to another embodiment, the security application 5 may also be adapted to check the code of the inspected webpage 9, so as to identify possible templates of the malware's code injections, such as textual portions that ask the user to type his user name or password, which normally should not appear in the inspected webpage 9. If such a template is detected, it is likely that is has been caused by malware that infected the user terminal 3.

According to another embodiment, the security application 5 may also be adapted to emulate navigations to several URLs, rather than causing transparent browser 14 to actually navigate to several URLs of websites that are likely to be attacked by malware. Emulation is used in order to save bandwidth and to eliminate identifications of legitimate changes in browsed pages as malware. In this case, the security application 5 is adapted to return an emulated webpage to the transparent browser 14, as it was returned by a particular real visited URL (e.g., a URL of a bank). This may be done by locally returning an emulated webpage that is selected from a local database, without the need to connect to the network interface (card) and regardless the navigations of the user via the interfaceable (real) browser 7. Also, since before browsing the transparent browser 14 usually calls a function (from a particular library), it is possible to use the security application 5 to intercept any such a call during runtime and before generating a data packet that reached the network interface and to return the emulated webpage to the transparent browser 14 on-the-fly. This way, the inspection process is faster and less noisy. Also, local inspection performed by the security application 5 also allows detecting malware that attacks webpages 9 that are served by several different browsers that may be used on the user terminal 3.

Using a transparent browser 14 as proposed by the present invention also allows further reducing noise effects, due to the fact that it is fully controlled by the security application 5. Therefore, it is possible to disable all the plug-ins and browser extensions, which perform legitimate modifications in the webpage 9 but sometimes are considered as originates from malware.

It is also possible to take webpages 9 that are accessed via the user interfaceable (real) browser 7 and to inspect them by the security application 5 by detecting changes in the code of each webpage, as described before. In this case, it is possible to install dedicated plug-ins in the interfaceable (real) browser 7, which are adapted to record webpages of interest (such as webpages that belong to a website of a bank). Then the recorded webpages are inspected by the security application 5. It is also possible to use a heuristic process to detect known textual pieces of code that the malware injects, as well as hidden frames that are being used by the malware. According to another embodiment, the security application 5 may also be adapted to check the code of the inspected webpage 9 upon being handed to the HTML parsing layer.

User interfaceable browser 7 may be any application suitable to provide network browsing capabilities that may be vulnerable to malware, operating at a sufficiently large data rate for such browsing operations even though transparent browser 14 is operating simultaneously. User terminal 3 may be any suitable device operating user interfaceable browser 7. Terminal 3 may include, for example, a personal digital assistant (PDA), a computer such as a laptop, a cellular telephone, a mobile handset, tablet computer, or any other device operable to browse the Internet. Terminal 3 may include any operating system such as, MAC-OS, WINDOWS, UNIX, LINUX, or other appropriate operating systems, e.g., mobile device operating systems (especially for smartphones) such as Symbian (Symbian Ltd.), iOS (Apple), Windows Phone (Microsoft) and Android (Google).

Figure 2:
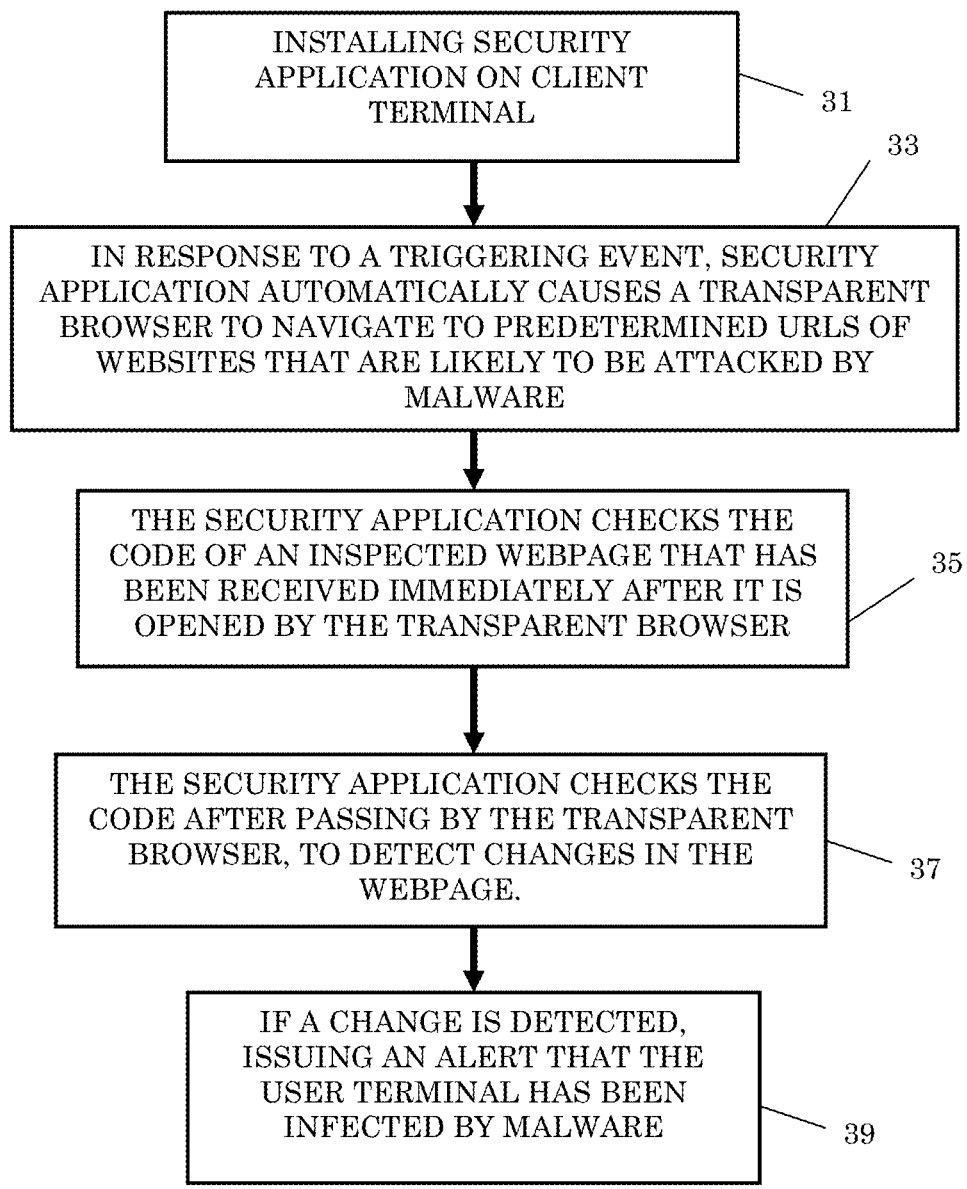
FIG. 2 is a flowchart of an embodiment of the method proposed by the present invention.

FIG. 2 is a flowchart of an embodiment of the method operable in conjunction with system 10 for detecting whether a webpage has been attacked by malware. At the first step 31, the security application 5 is installed on the terminal device 3 (client side). At step 33, upon detecting a predetermined triggering event which may be a process that is continuously running runs in the background (e.g., when the user activates the user interfaceable (real) browser installed on his user terminal to receive a webpage from a desired URL, upon starting the transparent browser 14 periodically, upon installing the security application 5, upon computer restart, or upon execution of any unknown software, etc.), the security application 5 automatically causes a transparent browser 14 to navigate to several URLs of websites that are likely to be attacked by malware. At the next step 35, the security application 5 checks the code of an inspected webpage 9 that has been received immediately after it is opened by the transparent browser 14. At the next step 37, the security application 5 checks the code again, after passing several processing steps by the transparent browser to detect changes in the webpage. At the next step 39, if a change is detected, issuing an alert that the user terminal has been infected by malware.

According to another embodiment, the security application 5 may also be adapted to check the code of the inspected webpage 9, so as to identify possible templates of the malware's code injections, such as textual portions that ask the user to type his user name or password, which normally should not appear in the inspected webpage 9. If such a template is detected, it is likely that is has been caused by malware that infected the user terminal 3.

According to another embodiment, the security application 5 may also be adapted to emulate navigations to several URLs that are likely to be attacked by malware, rather than performing real navigations, which consume bandwidth and network resources. Emulated navigations can also eliminate "noise" in the form of legitimate changes resulting from actual browsing to multiple websites, which may be considered as malware. In this case, the security application 5 is adapted to return an emulated webpage to the transparent browser 14, as it was returned by a particular real visited URL (e.g., a URL of a bank). This may be done by locally by returning an emulated webpage that is selected from a local database, without the need to connect to the network interface (card) and regardless the navigations of the user via the interfaceable (real) browser 7. Also, since before browsing the transparent browser 14 usually calls a function (from a particular library), it is possible to use the security application 5 to intercept any such a call during runtime and before generating a data packet that reached the network interface and to return the emulated webpage to the transparent browser 14 on-the-fly. This way, the inspection process is faster and less noisy. Also, local inspection performed by the security application 5 also allows detecting malware that attacks webpages 9 that are served by several different browsers that may be used on the user terminal 3.

Using a transparent browser 14 as proposed by the present invention also allows further reducing noise effects, due to the fact that it is fully controlled by the security application 5. Therefore, it is possible to disable all the plug-ins and browser extensions, which perform legitimate modifications in the webpage 9 but sometimes are considered as originates from malware.

It is also possible to take webpages 9 that are accessed via the user interfaceable (real) browser 7, to present them to transparent browser 14 and to inspect them by the security application 5 by detecting changes in the code of each webpage, as described before. In this case, it is possible to install dedicated plug-ins in the interfaceable (real) browser 7, which are adapted to record webpages of interest (such as webpages that belong to a website of a bank). Then the recorded webpages are served to the transparent browser 14 and are inspected by the security application 5.

It is also possible to passively analyze webpages 9 that are accessed via the user interfaceable (real) browser 7 while he is browsing, to present them to transparent browser 14 and to inspect them by the security application 5 by detecting changes in the code of each webpage, as described before. In this case, it is possible to use a heuristic process to detect known textual pieces of code that the malware injects, as well as hidden frames that are being used by the malware.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for detecting malware in a user terminal device that has been infected by malware via a browser running on said user terminal device, comprising:
   a) upon detecting a predetermined triggering event on said user terminal, automatically activating, by a security application installed on said terminal, a transparent browser to navigate to one or more predetermined URLs;

b) checking, by said security application, the code of a webpage at two different points in time during a processing of said webpage by said transparent browser, wherein the first of the two different points in time is immediately after said webpage is opened by said transparent browser, and
wherein the second of the two different points in time is during preparation for rendering said code by said transparent browser after said opened webpage is at least partially processed by said transparent browser;
c) detecting a change in said code between the two different points in time; and
d) if a change in said code is detected between the two different points in time, issuing an alert that said user terminal has been infected by malware.

2. A method according to claim 1, wherein the predetermined URLs correspond to websites that are likely to be attacked by malware.

3. A method according to claim 1, wherein the predetermined URLs are stored in a library.

4. A method according to claim 1, wherein the security application checks the code of an inspected webpage that has been received before being opened by the transparent browser, while being in HTML format.

5. A method according to claim 1, wherein instead of rechecking the code after being processed, the security application checks the code of an inspected webpage that has been received by identifying templates of the malware's code injections.

6. A method according to claim 5, wherein the templates are textual portions asking the user of the terminal device to type information into fields that are excluded from the code of an inspected webpage as received by the transparent browser.

7. A method according to claim 1, wherein instead of causing the transparent browser to navigate to predetermined URLs, the security application is adapted to emulate navigations to said URLs by locally returning an emulated webpage that is selected from a local database.

8. A method according to claim 7, wherein the security application emulate navigations to the URLs by:
a) intercepting call functions activated by the transparent browser during runtime and before generating data that reaches the network interface; and
b) locally returning an emulated webpage to the transparent browser.

9. A method according to claim 1, wherein plug-ins and browser extensions are disabled from the transparent browser.

10. A method according to claim 1, wherein instead of activating a transparent browser and rechecking the code after being processed, the security application detects changes in the code of each webpage by:
a) accessing webpages via the user interfaceable browser, while browsing; and
b) inspecting said webpages by using a heuristic process to detect known textual pieces of code that the malware injects and hidden frames that are being used by said malware.

11. A method according to claim 1, wherein the triggering event is selected from the following group:
detecting that the user activates the interfaceable browser;
a time based trigger;
restarting the user's terminal device.

* * * * *